(12) United States Patent
Hengstler

(10) Patent No.: US 10,422,682 B2
(45) Date of Patent: Sep. 24, 2019

(54) RADAR LEVEL GAUGE COMPRISING A SAFETY DEVICE

(71) Applicant: VEGA GRIESHABER KG, Wolfach (DE)

(72) Inventor: Clemens Hengstler, Haslach (DE)

(73) Assignee: VEGA GRIESHABER KG, Wolfach (DE)

( * ) Notice: Subject to any disclaimer, the term of this patent is extended or adjusted under 35 U.S.C. 154(b) by 280 days.

(21) Appl. No.: 15/309,364

(22) PCT Filed: Jul. 7, 2014

(86) PCT No.: PCT/EP2014/064492
§ 371 (c)(1),
(2) Date: Nov. 7, 2016

(87) PCT Pub. No.: WO2016/004977
PCT Pub. Date: Jan. 14, 2016

(65) Prior Publication Data
US 2017/0074710 A1 Mar. 16, 2017

(51) Int. Cl.
*G01F 23/284* (2006.01)
*H01Q 1/22* (2006.01)
(Continued)

(52) U.S. Cl.
CPC ........ *G01F 23/284* (2013.01); *G01F 25/0061* (2013.01); *H01Q 1/225* (2013.01);
(Continued)

(58) Field of Classification Search
CPC .... G01S 13/88; G01S 2007/4078; G01S 7/03; G01S 7/02; G01S 13/0209; G01S 7/024;
(Continued)

(56) References Cited

U.S. PATENT DOCUMENTS 6,995,706 B2 * 2/2006 Ohlsson ............... G01F 23/284
342/118
8,009,085 B2 * 8/2011 Kuhlow ............... G01F 25/0061
324/600

(Continued)

FOREIGN PATENT DOCUMENTS

| DE | 10 2010 040314 A1 | 3/2012 |
|---|---|---|
| EP | 0668488 A2 | 3/1995 |
| GB | 2285131 A | 6/1995 |

OTHER PUBLICATIONS

International Search Report for related application PCT/EP2014/064492, dated Jan. 4, 2015.

*Primary Examiner* — Olumide Ajibade Akonai
(74) *Attorney, Agent, or Firm* — William Gray Mitchell

(57) ABSTRACT

The invention relates to a radar level gauge comprising a signal generator for generating electromagnetic waves and an antenna for emitting the electromagnetic waves in a container and for receiving electromagnetic waves reflected by the container. The radar level gauge also comprises a safety device for verifying the functional capability or for improving the measuring quality of the radar level gauge, said safety device having a reflector and an adjustment device and/or a reduction device and being suitably designed to adjust the reflector and/or the reduction device at least between a first position, in which the reflector reflects the electromagnetic waves and a second position, in which the reflector reflects the electromagnetic waves in a reduced manner. The safety device also has at least one additional sensor for detecting a measured variable in the container.

11 Claims, 2 Drawing Sheets

(51) Int. Cl.
*G01F 25/00* (2006.01)
*G01S 13/10* (2006.01)
*G01S 13/88* (2006.01)
*H01Q 13/02* (2006.01)

(52) U.S. Cl.
CPC .............. *G01S 13/103* (2013.01); *G01S 13/88* (2013.01); *H01Q 13/02* (2013.01)

(58) Field of Classification Search
CPC ...... G01S 13/103; G01S 13/106; G01S 13/87; G01S 7/025; G01S 7/282; G01S 2007/027; G01F 23/284; G01F 25/0061; G01F 23/0076; H01Q 1/225; H01Q 15/14; H01Q 13/02; H01Q 13/0266; H01Q 25/00; Y10S 367/908
See application file for complete search history.

(56) References Cited

U.S. PATENT DOCUMENTS

| | | | | |
|---|---|---|---|---|
| 9,653,802 B2* | 5/2017 | Kech | ........................ | H01Q 3/20 |
| 2005/0264440 A1* | 12/2005 | Smith | ................... | G01F 23/284 |
| | | | | 342/124 |
| 2007/0194981 A1* | 8/2007 | Hagg | ...................... | G01F 23/18 |
| | | | | 342/124 |
| 2008/0100501 A1* | 5/2008 | Edvardsson | ............ | G01F 15/12 |
| | | | | 342/124 |
| 2013/0005372 A1* | 1/2013 | Strei | ................... | F28D 15/0275 |
| | | | | 455/500 |
| 2015/0009063 A1* | 1/2015 | Korsbo | ................ | G01F 23/284 |
| | | | | 342/124 |

* cited by examiner

RADAR LEVEL GAUGE COMPRISING A SAFETY DEVICE

CROSS REFERENCE TO RELATED APPLICATIONS

This patent application claims priority to International Patent Application PCT/EP2014/064492, filed on Jul. 7, 2014.

STATEMENT REGARDING FEDERALLY SPONSORED RESEARCH OR DEVELOPMENT

No federal government funds were used in researching or developing this invention.

NAMES OF PARTIES TO A JOINT RESEARCH AGREEMENT

Not applicable.

SEQUENCE LISTING INCLUDED AND INCORPORATED BY REFERENCE HEREIN

Not applicable.

BACKGROUND

Field of the Invention

The invention relates to a radar level gauge comprising a safety device.

Background of the Invention

Radar level gauges with safety devices are known from prior art, for example from U.S. Pat. No. 8,009,085 B2, and show a signal generator for generating electromagnetic waves and an antenna for emitting the electromagnetic waves into a container as well as for receiving reflected electromagnetic waves from the container, with the safety device being embodied suitable to check the functionality of the radar level gauge. The safety devices shown in prior art comprise for this purpose a reflector and an adjustment device, which are embodied suitable to adjust the reflector at least between a first position in which it reflects the electromagnetic waves and a second position in which it reflects the electromagnetic waves in a reduced fashion.

The radar level gauges known from prior art are generally used in containers, usually tanks or silos, which are embodied for storing various materials. For example food, drinks, drugs, or fuels are stored in such tanks or silos, so that a touchless fill level measurement is required. In prior art, for example the above-mentioned radar level gauges or alternatively ultrasound-based fill level gauges are known as touchless fill level measuring technologies. Based on their high precision of measurement and their low susceptibility to malfunction here radar level gauges are widely used.

The radar level gauges known from prior art are generally fastened via a flange in the upper area of the tank or silo, with an electronic being arranged outside the housing and an antenna of the radar level gauge being arranged inside thereof. The antenna is aligned in a suitable fashion so that electromagnetic waves, i.e. particularly a radar signal, can be sent in the direction towards the filled in material stored inside the container, and that it can receive electromagnetic waves reflected by said material. Based on a time difference between emitting the electromagnetic signal and receiving the reflected electromagnetic signal here a fill level inside the container can be determined. Potential measuring systems are here the pulse-radar system, in which radar pulses are emitted in the direction of the goods to be measured, are reflected there, and a fill level determination then occurs by determining the traveling time, as well as the frequency-modulated continuous wave method, in which a frequency-modulated high-frequency signal is emitted with increasing frequency and the fill level is then determined from the frequency difference between emitted and received signals.

For the functional control of a radar level gauge, particularly to test its functionality in a safety-relevant maximum fill level, a fill level at which an automatic protection system prevents any further filling in and perhaps at other relevant fill levels, it is necessary to provide a safety device, which allows a statement regarding the functionality at said maximum fill level. For this purpose, it is known in prior art during a safety test to move a reflector manually into the radiation path of the radar level gauge in order to test here, even in case of lower fill levels of the container, to check the function of the level gauge at a desired fill level by inserting the reflector at this fill level into the radiation path of the radar level gauge and this way to generate a reflection at the desired fill level.

In safety-relevant measuring applications it is common to provide additional sensors for detecting a fill level or limit in order to generate redundancy. Further it is common to monitor respective tanks additional for their temperature and/or pressure. In applications known from prior art here it is considered disadvantageous that in addition to the already provided radar level gauge with an integrated safety device, more assembly options must be provided for other sensors and tanks. This is considered particularly disadvantageous in that here the additional assembly opening, for example for a flange, increases the susceptibility for malfunctions of the entire system, for example with regards to tight seals.

Therefore, the objective of the present invention is to further develop a radar level gauge known from prior art and provided with a safety device such that the disadvantages known from prior art are avoided.

BRIEF SUMMARY OF THE INVENTION

In a preferred embodiment, a radar level gauge (1) with a signal generator for generating electromagnetic waves and an antenna (3) for emitting electromagnetic waves as well as for receiving reflected electromagnetic waves, comprising a safety device (5) for checking the functionality or for improving the quality of measurements of the radar level gauge (1), with the safety device (5) comprising a reflector (7) and an adjustment device (9) and/or a reduction unit (15) and being embodied suitable to adjust the reflector (7) and/or the reduction device (15) at least between a first position (I), in which the reflector reflects the electromagnetic waves, and a second position (II), in which the reflector reflects the electromagnetic waves in a reduced fashion, characterized in that the safety device comprises at least one additional sensor (11) for detecting a measurement.

In another preferred embodiment, the radar level gauge (1) as described herein, characterized in that at least one additional sensor (12) is arranged at the safety device (5) and/or integrated therein.

In another preferred embodiment, the radar level gauge (1) as described herein, characterized in that the additional sensor (12) is embodied as a fill level and/or limit sensor.

In another preferred embodiment, the radar level gauge (1) as described herein, characterized in that the additional sensor (12) is embodied as a capacitive operating fill level and/or limit sensor.

In another preferred embodiment, a radar level gauge (1) according to claim 4, characterized in that the safety device (5) comprises a guide tube (10) embodied as an electrode of the capacitive sensor.

In another preferred embodiment, the radar level gauge (1) as described herein, characterized in that the reflector is embodied as a capacitive sensor.

In another preferred embodiment, the radar level gauge (1) as described herein, characterized in that the additional sensor (12) is embodied as a vibration sensor or float or capacitive sensor operating with high-frequency, or ultrasound sensor, or temperature sensor.

In another preferred embodiment, the radar level gauge (1) as described herein, characterized in that the additional sensor is arranged angular at the safety device (5).

In another preferred embodiment, the radar level gauge (1) as described herein, characterized in that the additional sensor (12) of the adjustment device is coupled and preferably arranged at the adjustment device.

In another preferred embodiment, the radar level gauge (1) as described herein, characterized in that the additional sensor (12) is integrated in the reflector (7) or shows a sensor housing (11) embodied as a reflector (7).

In another preferred embodiment, the radar level gauge (1) as described herein, characterized in that the additional sensor (12) is embodied pivotally.

In another preferred embodiment, the radar level gauge (1) as described herein, characterized in that the arrangement comprises a temperature sensor and/or a pressure sensor.

DETAILED DESCRIPTION OF THE INVENTION

Figure 1:
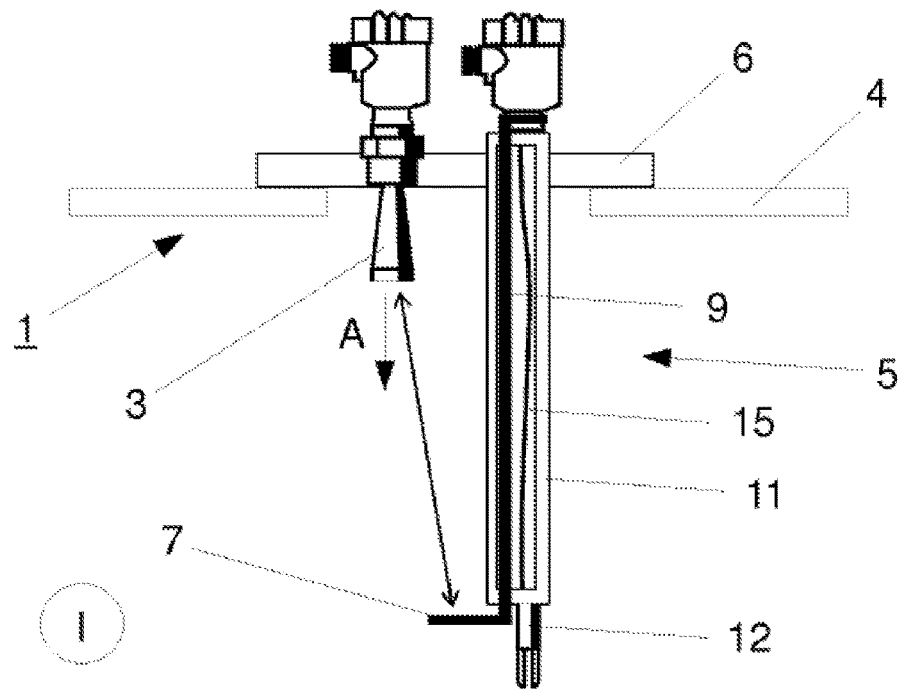
FIG. 1 is a line drawing evidencing a sketch of the principle of a first exemplary embodiment of a radar level gauge comprising an additional sensor and activated safety device.

A radar level gauge according to the invention with a signal generator for generating electromagnetic waves and an antenna for emitting the electromagnetic waves in a container as well as for receiving reflected electromagnetic waves from the container with a safety device for testing the functionality or for improving the quality of measurements of the radar level gauge, in which the safety device comprises a reflector and an adjustment device and/or a reduction device and is embodied suitable to adjust the reflector and/or the reduction device at least between a first position in which the reflector reflects the electromagnetic waves, and a second position in which the reflector reflects the electromagnetic waves in a reduced fashion, is characterized in that the safety device comprises at least one additional sensor for determining a measurement in the container. As a reduction device, for example an absorbent material or a diffuser can be used, which covers or shadows the reflector when seen from the antenna and this way the electromagnetic waves emitted are reflected only to a reduced extent.

By the arrangement according to the invention another sensor is integrated in the radar level gauge with a safety device, so that additional fastening arrangements can be waived, for example flanges as well as the openings necessary for them in the container.

In a particularly beneficial embodiment at least one additional sensor is arranged at the safety device and/or integrated therein. This way it become possible that the additional sensor can be distanced from the signal generator and the antenna and arranged at a measuring height, for example a safety-relevant maximum fill level, at which an automatic protective system prevents any further filling or at other relevant fill levels. Further, by an arrangement at the safety device or an integration in the safety device it is achieved that compared to radar level gauges of prior art with safety devices here no additional space is required and thus existing fastening devices, for example flanges, can still be used.

The additional sensor may for example be embodied as a fill level and/or limit sensor. By providing an additional fill level sensor or a limit sensor here a redundancy is generated for the measurements of the radar level gauge, so that at least in a safety-critical area at least one second measurement is available for checking plausibility The additional sensor can here be embodied as a capacitive operating fill level and/or limit sensor, for example. In a particularly beneficial embodiment the safety device is provided for this purpose with a guide tube, in which the adjustment device is accepted and guided, with the guide tube being embodied as an electrode of the capacitive sensor. In this embodiment an isolator is arranged between the guide tube and the adjustment device, which electrically isolates the adjustment device in reference to the guide tube.

Additionally or alternatively another sensor may be formed as a vibration sensor.

When a temperature sensor is pivoted into the tube as another or additional sensor, here a float, a capacity measurement operating with high-frequency, or an ultrasound sensor are possible in the tube.

In one embodiment in which the additional sensor is embodied as a vibration sensor, by the additional sensor, for example the limit can be detected at a lower end of the safety device, so that in additional to the fill level relevant for safety tests with a reflector, here the limit can be detected for securing the measurements of the radar level gauge.

The additional sensor may also be arranged angular to the safety device such that by the additional sensor no additional constructive length is required, which would force the arrangement of the additional sensor in case of a lower fill level.

The additional sensor can here be particularly coupled to the adjustment device and preferably be arranged at the adjustment device. The additional sensor may here particularly be integrated in the reflector or show a sensor housing embodied as a reflector.

If for example a vibration sensor is used as the additional sensor, it can be embodied with a sensor housing acting as a reflector and for example be arranged at an angle ranging from 45° to 90° in reference to a longitudinal axis of the safety device and/or a primary direction of emission of the antenna. The additional sensor can here be pivoted by the adjustment device into the radiation path of the radar level gauge such that it can reflect the magnetic waves emitted by the antenna for a safety check and simultaneously in normal operation, i.e. when the additional sensor is pivoted out of the radiation path of the radar level gauge, this allows the detection of a limit.

Additionally or alternatively the arrangement may show a temperature sensor and/or a pressure sensor. Due to the fact that both the temperature and the pressure, for example in gaseous media (also applicable for liquid ones) are highly relevant for safety, here additional measuring safety can be generated. The same also applies for liquid media. The present invention can be used, among other things, for TDR (time domain reflectometry) systems with guided radar waves, the pulsed radar system, as well as the FMCW (frequency modulated continuous wave) system.

DETAILED DESCRIPTION OF THE FIGURES

FIG. 1 shows a first exemplary embodiment of a radar level gauge 1 with a safety device 5 for testing the functionality of the radar level gauge 1 at a safety-relevant maximum fill level.

The radar level gauge 1 comprises a signal generator and an antenna 3, in the present case embodied as a horn antenna with a main direction of emission A. A safety device 5 is provided with a reflector 7 arranged pivotally via an adjustment device 9 for a functional test of the radar level gauge 1. In the first position I shown in FIG. 1 the reflector 7 is pivoted into a radiation path of the radar level gauge 1 and thus reflects electromagnetic waves emitted by the antenna 3 back to the antenna 3 such that an echo develops at a fill level corresponding to the installation height of the reflector 7. This way it can be checked if the radar level gauge 1 reliably detects fill levels at the height of the reflector 7.

In the present exemplary embodiment the safety device 5 is embodied with a tubular housing 11, by which the adjustment device 9 acts from outside the container 4 upon the reflector 7. In the present exemplary embodiment a mechanic coupling of the reflector 7 is shown with the adjustment device 9, with here other couplings being possible as well, for example via an electric drive, a pneumatic coupling, or a magnetic coupling.

At the inside of the housing 11, aligned parallel in reference to the primary direction of emission A of the antenna 3, an additional sensor 12 is arranged, embodied in the present case as a vibration limit switch. The additional sensor 12 is connected via a connection line 15 to a sensor electronic, in the present case provided in an electronic housing arranged outside the container 4, so that the sensor signal can be processed.

Both the radar level gauge 1 as well as the safety device 5 with the additional sensor 12 arranged thereat are fastened via a common fastening flange 6 at the container 4, with its fill level being monitored. With a flange connection here a reliable sealing of the container 4 can occur in reference to the environment such that high security is ensured particularly in case of applications with pressurized and/or toxic media.

Figure 2:
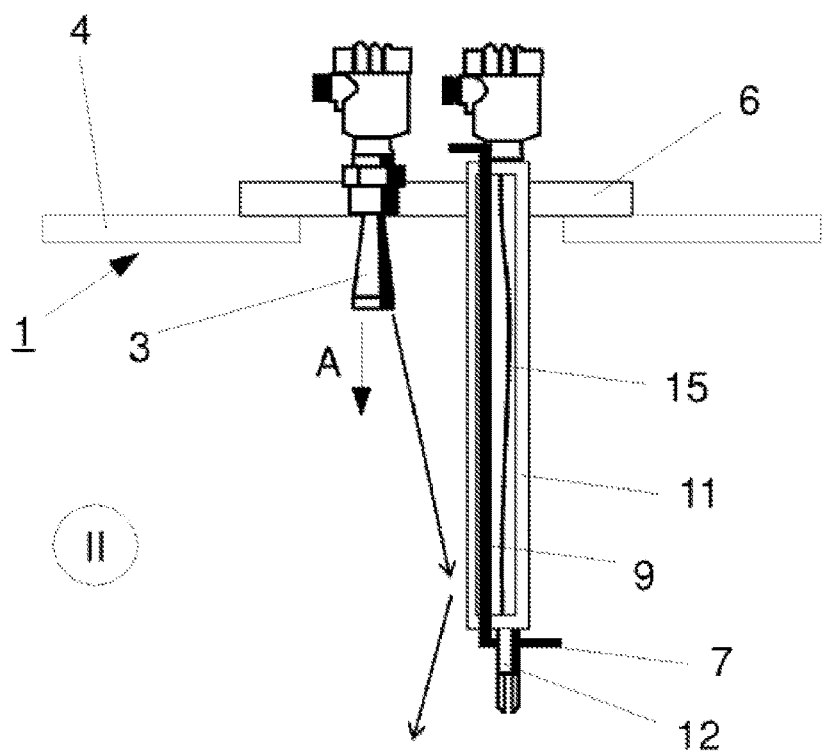
FIG. 2 is a line drawing evidencing the radar level gauge of FIG. 1 with an active safety device.

FIG. 2 shows an arrangement of FIG. 1 in a second position II, in which the reflector 7 of the safety device 5 is pivoted out of the radiation path of the radar level gauge 1 such that no reflection occurs by the reflector 7 of the electromagnetic waves emitted by the antenna 3. In this second position II, in which the safety device 5 is deactivated, the safety relevant fill level in which the reflector 7 is arranged can still be monitored by the additional sensor 12, in the present case the vibration limit switch. It can be ensured this way that even in case the radar level gauge 1 malfunctions, here reliable measuring signals can be generated in this safety-critical fill level and perhaps an additional filling of the container 4 can be prevented.

Figure 3:
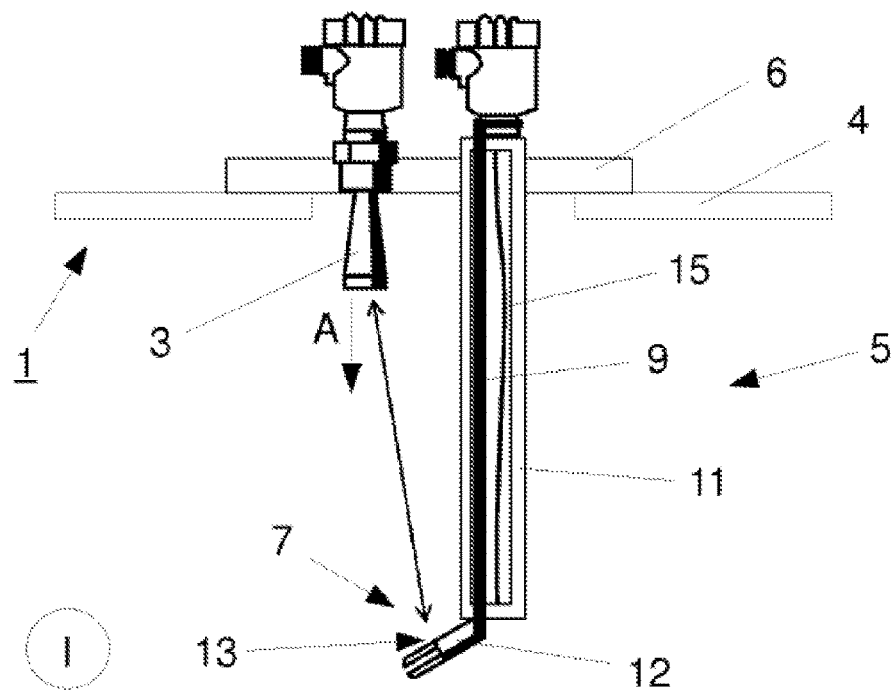
FIG. 3 is a line drawing evidencing a second exemplary embodiment of a radar level gauge with an additional sensor embodied with a reflector.

FIG. 3 shows a second exemplary embodiment of a radar level gauge 1 with an additional sensor 12, in the present case the additional sensor 12, which is also embodied as a vibration limit switch comprising a suitably embodied sensor housing 13 and simultaneously serves as a reflector 7 of the safety device 5.

In the present exemplary embodiment the additional sensor 12 is supported by the adjustment device 9 in a pivotal fashion at the housing 11 of the safety device 5 so that the additional sensor 12 can be either pivoted into the radiation path of the radar level gauge 1 or out of it. Ideally, the additional sensor 12 is here arranged such that a surface of the sensor housing 13 oriented in the direction of the antenna 3 shows an angle from 45° to 90° in reference to the primary direction of emission A of the antenna 3. This way as shown in FIG. 3, when the additional sensor 12 is in the first position I, the electromagnetic waves emitted by the antenna 3 can be reflected, generating a reliable echo signal at the fill level monitored by the safety device 5.

Figure 4:
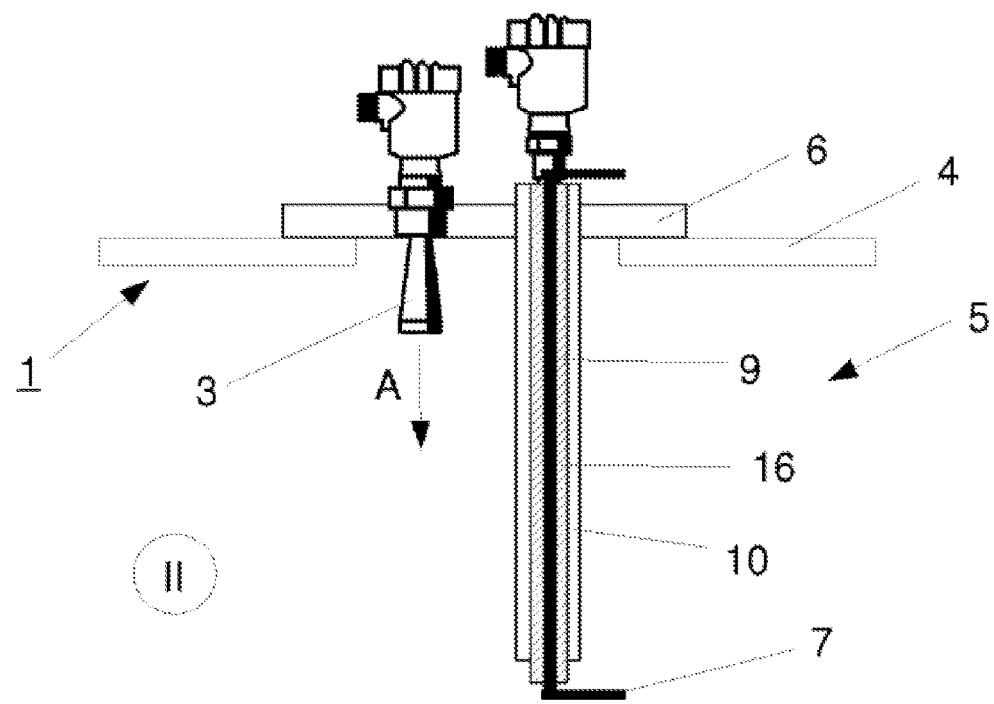
FIG. 4 is a line drawing evidencing a third exemplary embodiment of a radar level gauge with a capacitive fill level sensor.

FIG. 4 shows a third exemplary embodiment of a radar level gauge 1 with a safety device 5, with the safety device 5 in the present case being embodied with a guide tube 10 in which the adjustment device 9 is guided and isolated by an isolator 16. The guide tube 10 of the present exemplary embodiment is here embodied as an electrode of a capacitive fill level sensor, allowing to continuously measure the fill level in an area in which the safety device 5 is provided.

Alternatively, it is possible to embody the reflector (7) as a capacitive limit sensor. Here, the guide tube acts as a counter-electrode, perhaps in coordination with the container.

All of the above-mentioned exemplary embodiments have in common that by the arrangement shown the monitoring of a critical fill level of the container 4 can occur in a space-saving and redundant fashion, and thus increased measuring safety is yielded. This redundant measuring device allows monitoring the first measuring results at least temporarily.

In the exemplary embodiments shown the second sensor is respectively arranged at the same flange as the first sensor. However it may also be arranged only in the same container and fastened with an additional flange. An arrangement at a single flange is preferred, though.

LIST OF REFERENCE NUMBERS 1 radar level gauge
3 antenna
4 container
5 safety device
6 fastening flange
7 reflector
9 adjustment device
10 guide tube
11 housing
12 additional sensor
13 sensor housing
15 connection line
16 isolator
A direction of emission
I first position
II second position The references recited herein are incorporated herein in their entirety, particularly as they relate to teaching the level of ordinary skill in this art and for any disclosure necessary for the commoner understanding of the subject matter of the claimed invention. It will be clear to a person of ordinary skill in the art that the above embodiments may be altered or

I claim:

1. A radar level gauge with a signal generator for generating electromagnetic waves and an antenna for emitting electromagnetic waves as well as for receiving reflected electromagnetic waves, comprising a safety device for checking the functionality or for improving the quality of measurements of the radar level gauge with the safety device comprising a reflector and an adjustment device and a reduction unit and being embodied suitable to adjust the reflector and a reduction device at least between a first position, in which the reflector reflects the electromagnetic waves, and a second position, in which the reflector reflects the electromagnetic waves in a reduced fashion, wherein the safety device comprises at least one sensor for detecting a measurement value to generate redundancy; wherein at least one additional sensor is arranged at the safety device or integrated therein.

2. The radar level gauge according to claim 1, wherein the sensor is embodied as a fill level and limit sensor.

3. The radar level gauge according to claim 2, wherein the additional sensor is embodied as a capacitive operating fill level and limit sensor.

4. The radar level gauge according to claim 3, wherein the safety device comprises a guide tube embodied as an electrode of the capacitive sensor.

5. The radar level gauge according to claim 3, wherein the reflector is embodied as a capacitive sensor.

6. The radar level gauge according to claim 1, wherein the sensor is embodied as a vibration sensor or float or capacitive sensor operating with high-frequency, or ultrasound sensor, or temperature sensor.

7. The radar level gauge according to claim 1, wherein the sensor is arranged angular at the safety device.

8. The radar level gauge according to claim 1, wherein the sensor of the adjustment device is coupled and arranged at the adjustment device.

9. The radar level gauge according to claim 8, wherein the sensor is integrated in the reflector or shows a sensor housing embodied as a reflector.

10. The radar level gauge according to claim 8, wherein the sensor is embodied pivotally.

11. The radar level gauge according to claim 1, wherein the arrangement comprises a temperature sensor and/or a pressure sensor.

* * * * *